(12) United States Patent
Williams et al.

(10) Patent No.: US 8,752,288 B2
(45) Date of Patent: Jun. 17, 2014

(54) LEAF SEAL

(75) Inventors: David S. Williams, Derby (GB); Ingo H. J. Jahn, West End (AU); Gervas Franceschini, Derby (GB)

(73) Assignee: Rolls-Royce PLC, London (GB)

( * ) Notice: Subject to any disclaimer, the term of this patent is extended or adjusted under 35 U.S.C. 154(b) by 2 days.

(21) Appl. No.: 13/564,447

(22) Filed: Aug. 1, 2012

(65) Prior Publication Data
US 2013/0038026 A1  Feb. 14, 2013

(30) Foreign Application Priority Data

Aug. 9, 2011 (GB) .................................. 1113691.8

(51) Int. Cl.
*B21K 25/00* (2006.01)
(52) U.S. Cl.
USPC ..... 29/889.2; 277/355; 415/173.7; 415/174.2
(58) Field of Classification Search
USPC ............. 29/889.2; 277/355; 415/173.7, 174.2
See application file for complete search history.

(56) References Cited

U.S. PATENT DOCUMENTS

| | | | | |
|---|---|---|---|---|
| 7,828,297 | B2* | 11/2010 | Hoebel et al. | 277/412 |
| 8,100,404 | B2* | 1/2012 | Williams | 277/355 |
| 2002/0014009 | A1 | 2/2002 | Hobbs et al. | |
| 2003/0174918 | A1 | 9/2003 | Suh et al. | |
| 2005/0125983 | A1* | 6/2005 | Uehara et al. | 29/458 |
| 2007/0085277 | A1* | 4/2007 | Rhodes et al. | 277/355 |
| 2007/0120326 | A1* | 5/2007 | Rhodes et al. | 277/355 |
| 2007/0261225 | A1* | 11/2007 | Hogg et al. | 29/458 |
| 2008/0099999 | A1* | 5/2008 | Williams | 277/355 |
| 2008/0122183 | A1* | 5/2008 | Braun et al. | 277/355 |
| 2009/0243221 | A1* | 10/2009 | Olmes et al. | 277/411 |
| 2009/0250879 | A1* | 10/2009 | Ruggiero et al. | 277/355 |
| 2010/0143102 | A1* | 6/2010 | Deo et al. | 415/173.1 |
| 2010/0320697 | A1* | 12/2010 | Kono | 277/355 |

FOREIGN PATENT DOCUMENTS

| | | |
|---|---|---|
| EP | 1 365 181 A2 | 11/2003 |
| EP | 1 878 955 A1 | 1/2008 |
| WO | WO 2005/103536 A1 | 11/2005 |

OTHER PUBLICATIONS

Jan. 4, 2013 European Search Report issued in European Application No. EP 12 17 8792.
Search Report issued in British Patent Application No. 1113691.8 dated Dec. 8, 2011.

* cited by examiner

*Primary Examiner* — David Bryant
*Assistant Examiner* — Ruth G Hidalgo-Hernande
(74) *Attorney, Agent, or Firm* — Oliff, PLC

(57) ABSTRACT

A first process is provided for forming a stack of leaves for use in a leaf seal which effects a seal between two components. Corresponding processes are provided for forming a leaf-spacer pair and then for forming a stack of leaves from such pairs. Each leaf of the stack has a leaf section which maintains wiping contact with one of the components and a root section which is fixed relative to the other component and from which the leaf section extends. The stack includes a plurality of spacers which interpose between the root sections.

19 Claims, 12 Drawing Sheets

Fig.3
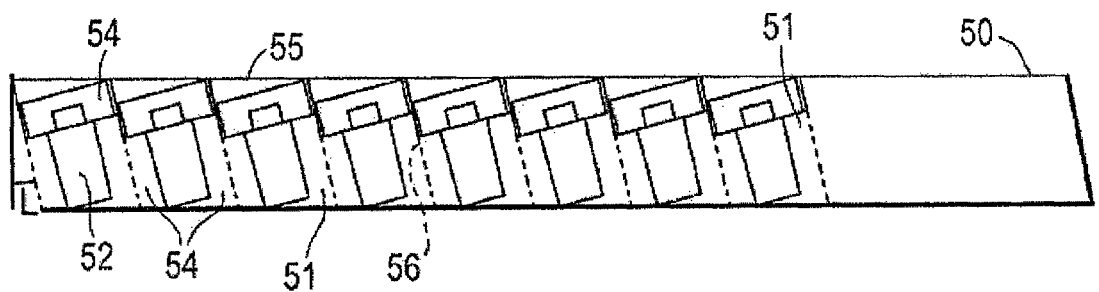
Fig.4
(a)
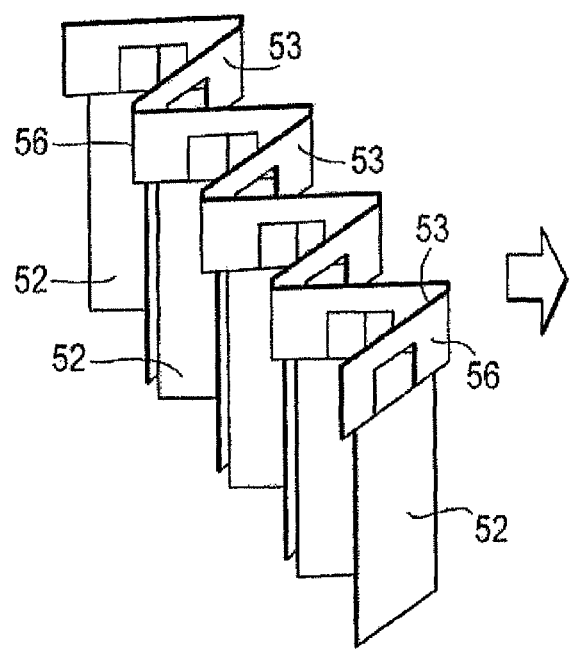
(b)
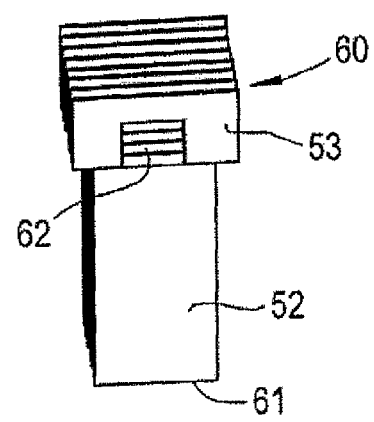

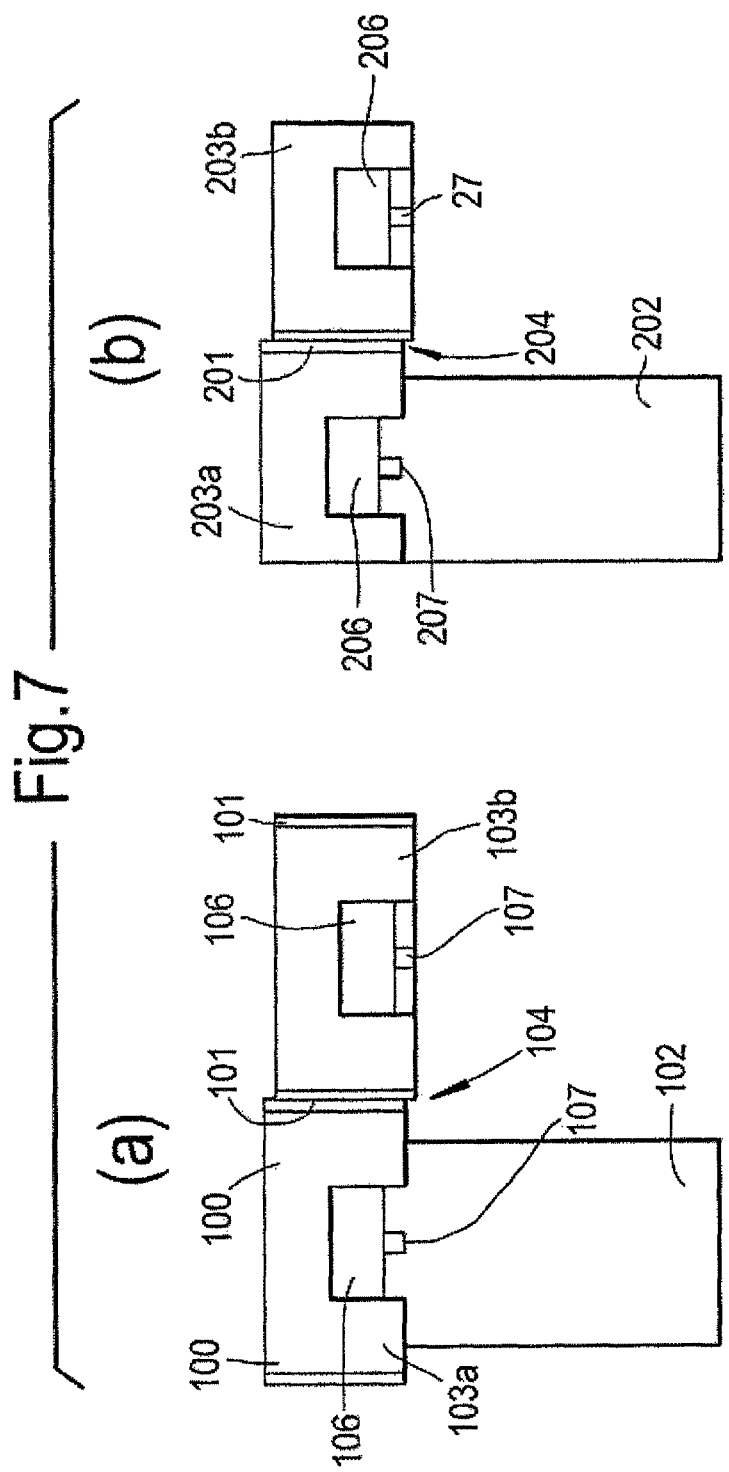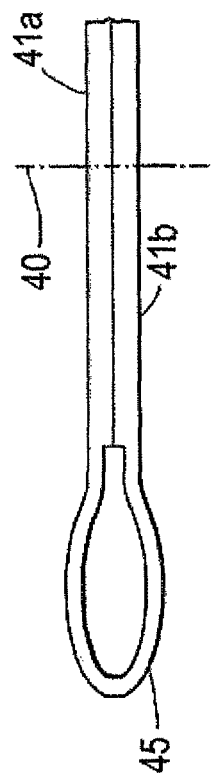

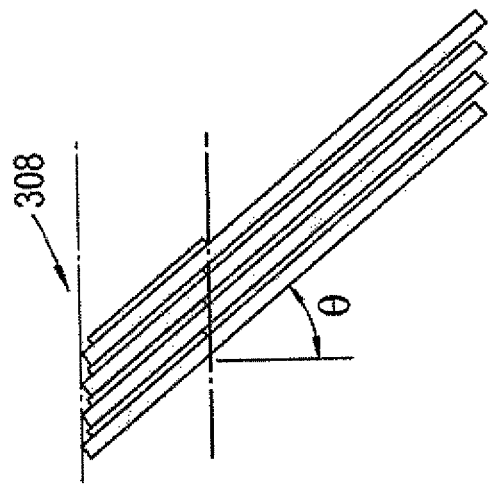
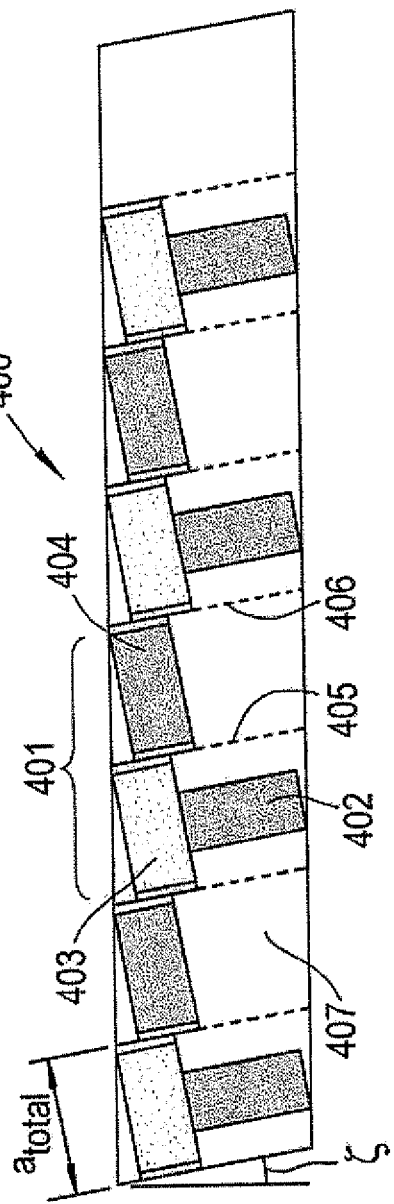

(a) (b)

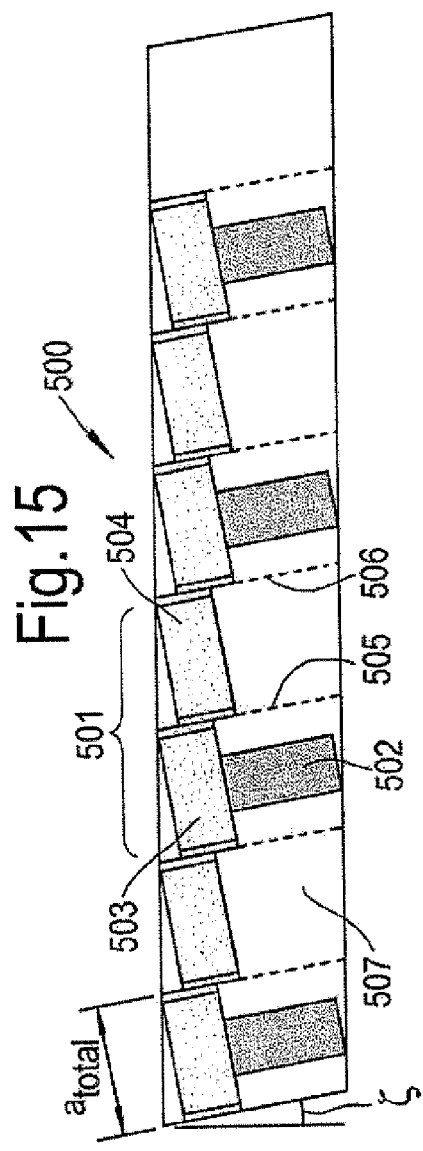
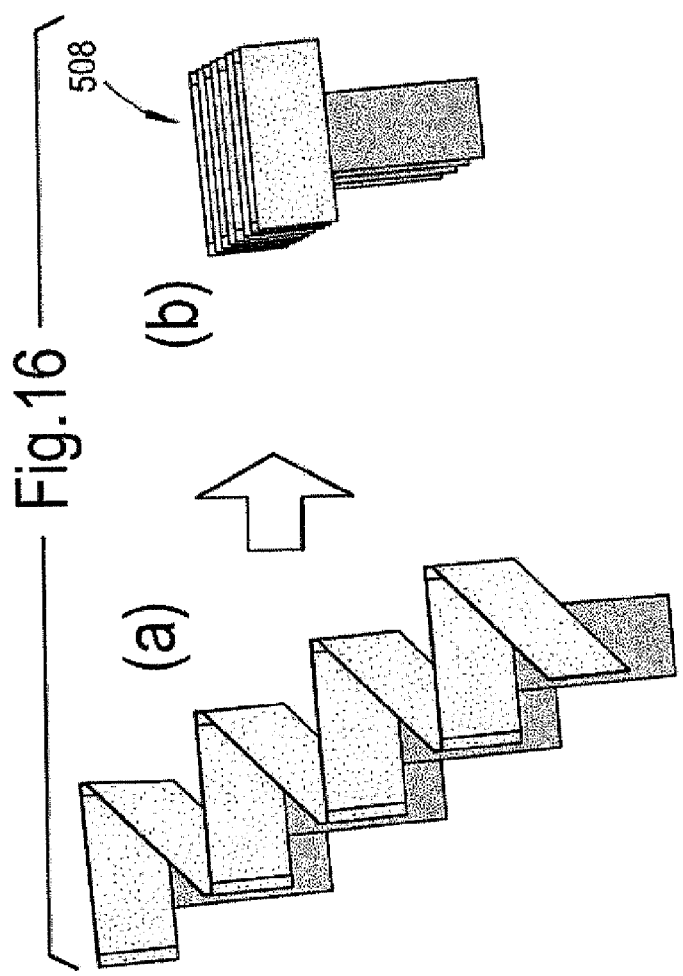

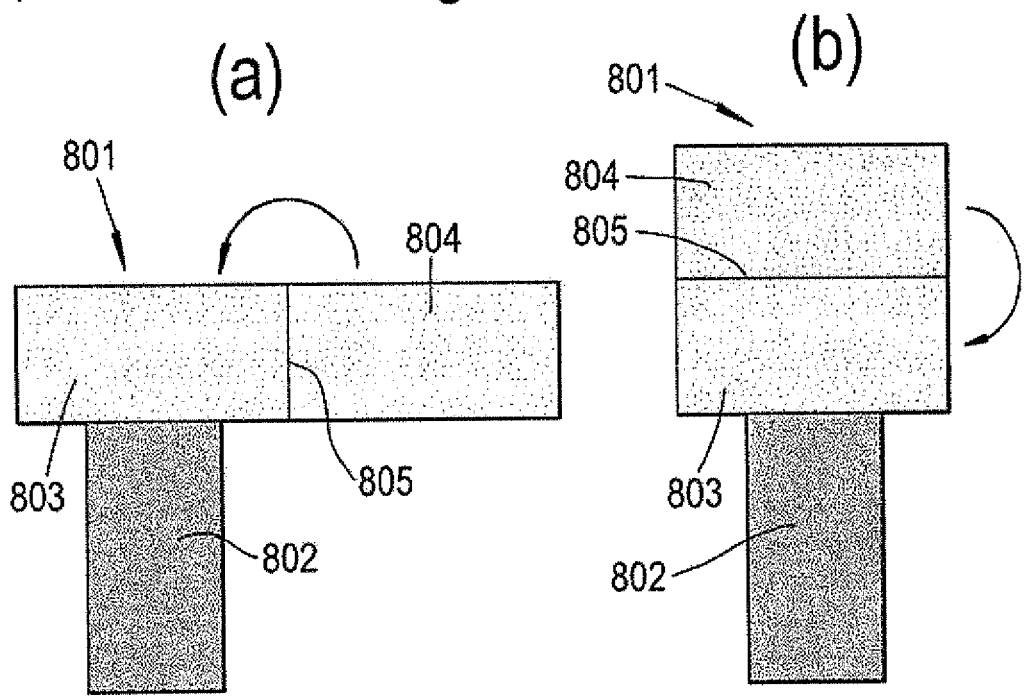
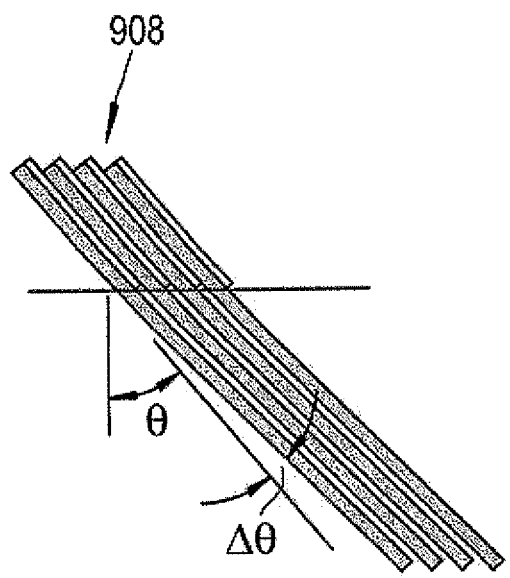

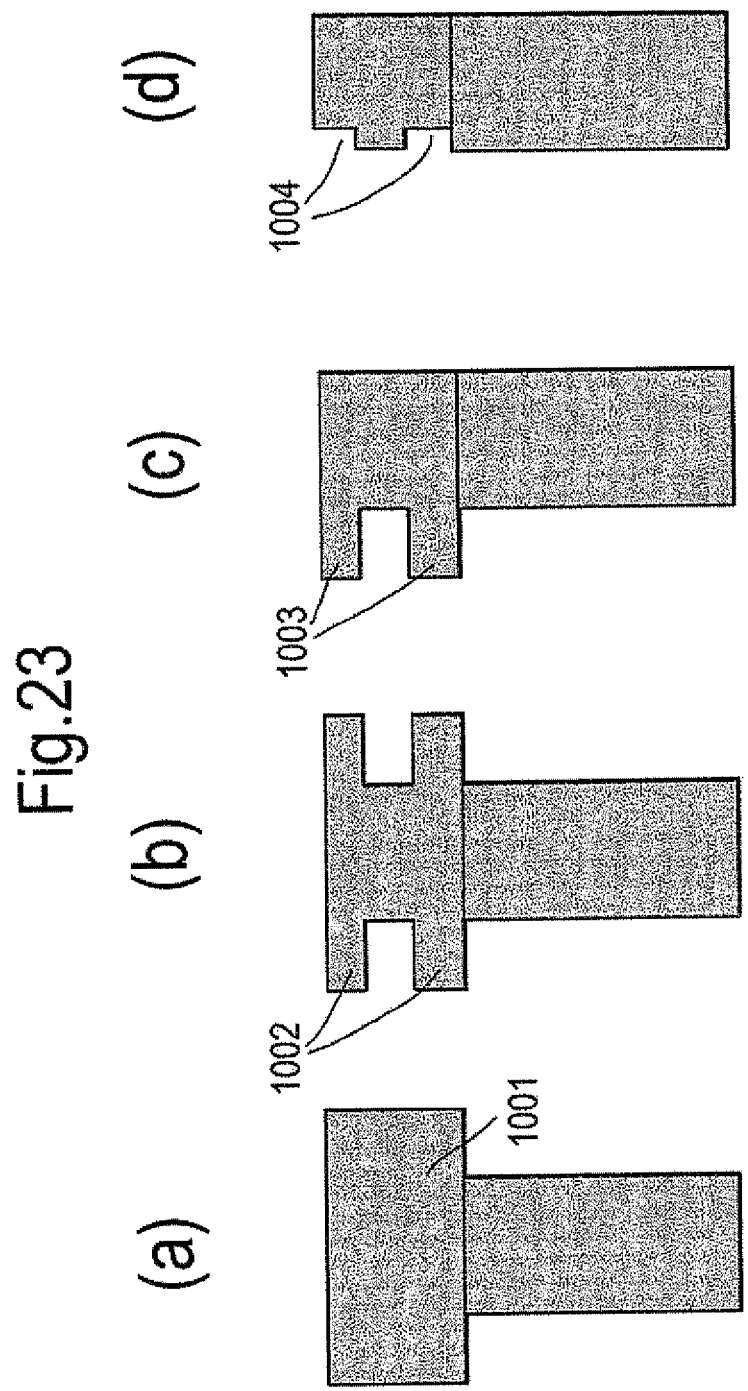

LEAF SEAL

The present invention relates to a process for forming a leaf-spacer pair or a stack of leaves for use in a leaf seal.

With reference to FIG. 1, a ducted fan gas turbine engine generally indicated at 10 has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 13 and a second air flow B which is passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Leaf seals are formed from sections of leaf material appropriately presented in order to create a seal surface from juxtaposed leaf edges of respective leaves in an assembly. Typically the leaves are arranged circumferentially about a rotating shaft in order to present the leaf edges and therefore the seal surface towards that shaft in order to provide a seal barrier. Typically, spacer members are provided between each leaf in order to correctly arrange the seal elements for presentation of the leaf edges and therefore the seal surface. These spacers may be independent components or integrally formed with each leaf seal. The leaf edges and so the seal surface effectively floats upwards and downwards relative to a rotating surface.

In a gas turbine engine, leaf seals may be used to form a seal between a static component and a rotating component, between two relatively rotating components, or even between two static components in order to maintain a in relatively high pressure on one side of the seal and relatively low pressure on the other. FIG. 2, which shows schematically, for example, a cut-away perspective view of a portion of a leaf seal assembly 31 comprises seal elements 32 extending from spacer elements 33 secured in a housing comprising a backing ring 34 with side plates 35. The seal leaf elements 32 present leaf edges 36 towards a surface 37 of a rotating component generally rotating in the direction depicted by arrowhead 38. The leaves 32, and in particular the leaf edges 36 of the leaves 32 act against the surface 37 in order to create a seal across the assembly 31. Each leaf section 32 is generally compliant in order to adjust with rotation of the surface 11 to ensure that a good sealing effect is created. The spacers 33 are generally required in order to ensure that flexibility is available to appropriately present the leaf seal elements 32 towards the surface 37 which, as illustrated, is generally with an inclined angle between them.

Assembly of leaf seals is relatively complex in terms of the number of leaves in the assembly and the importance of correctly aligning and spacing leaves in order to achieve best effect. Formation of leaf seals using a pleated band or strip has been proposed and is described in WO 015933802. In this arrangement a metal strip is essentially stamped in order to define a plurality of leaf sealing elements and the strip or band then folded in order to create by concertina compression a leaf seal which is then mounted within a housing for presentation towards a surface to be sealed. Unfortunately, such an arrangement is not ideal in that the edges of leaf seal elements are not generally efficiently presented towards the surface to be sealed and each seal element is substantially flat and abuts against itself such that in compression there is significant strain on the folded section at the corners of each seal element and inadequate control of space in between elements for best sealing effect. It will be understood that leaf seals depend upon the space in between the leaf edges in order to be effective. If leaf seal edges are not effectively suspended, then either a large gap will open up under the leaves or a heavy contact will occur between the leaf edges and the shaft, both of which will lead to an ineffective seal.

EP A 1878955 proposes a method of forming leaf seals comprising etching leaves in a strip, each leaf being etched at a tilt angle to create a step when each leaf is concertina folded against its adjacent neighbour, and folding the strip whereby the leaves are juxtaposed to present a seal surface formed by each leaf edge of each leaf. EP A 1878955 also proposes a method of forming leaf seals comprising etching leaves in a strip, each leaf having a spacer section, and spacers for the leaves being defined by removal of at least part of the remainder of at least some of the leaves.

Thus FIG. 3 shows schematically a strip 50 appropriately photochemically machined in order to create respective leaf seal sections 51. Each leaf seal section 51 comprises a seal element leaf 52 and a root section 53. Due to the tilt angle L, which is exaggerated for convenient demonstration, there are waste areas in relation to sides 54 and top 55 which are removed as required. The root sections 53 are of thicker section than the operational leaf seal elements 52 and this is achieved in the strip 50 through appropriate machining such as photo-chemical machining of the leaf seal elements 52. Between each leaf section 51 a fold section 56 is provided to enable a zigzag fold to be performed. The fold sections 56 can also be thinned to reduce stresses on bending.

FIG. 4 illustrates schematically folding of the leaf sections formed by provision of the folded sections 56 and the removal of the waste areas 54, 55 from the strip 50 depicted in FIG. 3. Thus, as can be seen with the waste areas 54, 55 removed, the root sections 53 are still attached at the fold lines 56 in a staggered configuration. As the folding section 56 is of a thinner section, a zigzag fold can be provided about these sections 56 in order to move through the stage depicted in FIG. 4(a) to a compressed stack or tuft 60 with juxtaposed root sections 53 presenting the seal elements 52 at an appropriate lay angle as depicted in FIG. 4(b). Essentially, the stack 60 leans such that bottom leaf edges 61 are appropriately presented in use relative to a seal surface. Typically a hole 62 is provided in each root section 53 in order to create a plenum chamber by the juxtaposed root sections 53 in order to achieve the desired pressure distribution about a seal assembly in use.

As shown in FIGS. 5 and 6, it is possible to create a strip 80 in which leaf elements 81 are again defined between fold sections 86, but alternate leaf sections 81a, 81b are arranged such that in leaf section 81a a root section 83a is provided along with a leaf seal element 82, whilst in adjacent leaf section 81b the whole of the strip (i.e. the area 85 as well as area 87) other than a spacer 83b between root sections 83a to which seal elements 82 are attached. This allows larger inter-leaf gaps to be formed.

A zigzag fold is then performed about fold edges 86 in order to create a compressed stack 90 which has alternating root section 83a and spacers 83b juxtaposed to each other. Again, a pressure equalisation plenum chamber is created by holes 92 in each root section 83a and spacer 83b which extends annularly about the seal assembly to achieve sealing efficiency.

Leaf-spacer folded pairs may also be provided. A multitude of such pairs can be assembled into a leaf seal assembly.

As depicted in FIG. 7(a) a double side arm arrangement has a root section 103a with a hole 106 to provide a plenum chamber for pressure distribution in the eventual seal assembly. Again folded sections 101 are provided such that there is a step between the spacer 103a to which a seal element 102 is secured and a spacer 103b. In the double arm arrangement depicted in FIG. 7(a) there is an arm 100 in the root section 103a either side of the element 102. The stepped alignment 104 is again determined by the tilt angle in the strip from which the leaf-spacer folded pair is formed.

As depicted in FIG. 7(b) a single arm leaf-spacer folded pair is depicted. Thus, again a root section 203a is provided to which a seal element 202 is secured with an aperture 206 in order to form a plenum chamber for pressure distribution in use. There is a step between the root section 203a and a spacer 203b. Again, there is a fold section 201 in between the root section 203a and the spacer 203b in order to form the leaf-spacer folded pair for assembly into a leaf seal assembly as described later.

Both the arrangements of leaf-spacer folded pairs depicted in FIG. 7 can be appropriately photochemically machined from a sheet, and both may incorporate reinforcing 107, 207 to facilitate assembly strengths.

The leaf stacks and leaf-spacer folded pairs described above are fitted into an assembly jig and joined together e.g. by a welding or brazing processes, as described in EPA 1878955, to form complete leaf seal assemblies. After joining, the folding sections are generally machined away. For example, FIG. 8 is illustrates an exaggerated fold between two leaf sections. Thus, leaf section 41a is forced into abutment and brazed or welded or otherwise secured in position against leaf section 41b. The folding section 45 is thinned and as depicted rounded to reduce stressing. The section to the left of broken line 40 can be machined away after brazing the leaf sections 41a, 41b together.

An aim of the present invention is to provide performance improvements in leaf seals.

Accordingly a first aspect of the present invention provides a process for forming a leaf-spacer pair for use in a leaf seal which effects a seal between two components, the leaf-spacer pair having a leaf section which maintains wiping contact with one of the components and a root section which is fixed relative to the other component and from which the leaf section extends, the leaf-spacer pair further having a spacer which overlays the root section, wherein the process includes the steps of:
  (a) providing a region of sheet of substantially uniform thickness, the sheet region having a leaf section portion, a root section portion from which the leaf section portion extends, and a spacer portion which is connected to the root section portion along a fold line;
  (b) thinning the root section portion and/or the spacer portion, the leaf section portion retaining said thickness; and
  (c) folding the spacer portion onto the root section portion along the fold line to form a leaf-spacer pair in which a spacer overlays a root section and a leaf section extends therefrom.

And a second aspect of the present invention provides a process for forming a stack of leaves for use in a leaf seal, the process including:
  repeatedly performing the process of the first aspect to form a plurality of leaf-spacer pairs; and
  combining the leaf-spacer pairs into a stack in which the leaf sections are arranged face-to-face and the spacers interpose between the root sections to space the leaf sections a controlled distance apart.

A related third aspect of the present invention provides a process for forming a stack of leaves for use in a leaf seal which effects a seal between two components, each leaf of the stack having a leaf section which maintains wiping contact with one of the components and a root section which is fixed relative to the other component and from which the leaf section extends, the stack including a plurality of spacers which interpose between the root sections, wherein the process includes the steps of:
  (a) providing a sheet of substantially uniform thickness and containing a plurality of sheet regions, each sheet region having a leaf section portion, a root section portion from which the leaf section portion extends, and a spacer portion which is connected to the root section portion along a first fold line, wherein the spacer portion of each sheet region is also connected to the root section portion of a neighbouring sheet region along a second fold line to provide an alternating line of connected root section portions and spacer portions;
  (b) for each sheet region, thinning the respective root section portion and/or the respective spacer portion, the respective leaf section portion retaining said thickness; and
  (c) zigzag folding the alternating line of spacer portions and the root section portions along the first and second fold lines such that for each sheet region the respective spacer portion is folded onto the respective root section portion to form a leaf-spacer pair, and the leaf-spacer pairs are combined into a stack in which the leaf sections are arranged face-to-face and the spacers interpose between the root sections to space the leaf sections a controlled distance apart.

A fourth aspect of the present invention provides a leaf-spacer pair for use in a leaf seal, the leaf-spacer pair being formed by the process of the first aspect. Thus, the fourth aspect provides a leaf-spacer pair for use in a leaf seal which effects a seal between two components, the leaf-spacer pair having a leaf is section which, in the leaf seal, maintains wiping contact with one of the components, and a root section which, in the leaf seal, is fixed relative to the other component and from which the leaf section extends, the leaf-spacer pair further having a spacer which overlays the root section, wherein the leaf section, the root section and the spacer are formed from a region of sheet of substantially uniform thickness, the spacer being connected to the root section along a fold line and being folded there-along onto the root section, and wherein the root section portion and/or the spacer portion is thinned relative to said thickness, but the leaf section portion retains said thickness. A fifth aspect of the present invention provides a stack of leaves for use in a leaf seal, the stack being formed by the process of the second or third aspect. Thus, the fifth aspect provides a stack of leaves for use in a leaf seal, the stack including a plurality of leaf-spacer pairs of the second aspect combined into a stack in which the leaf sections are arranged face-to-face and the spacers interpose between the root sections to space the leaf sections a controlled distance apart. The fifth aspect also provides a stack of leaves for use in a leaf seal, the stack including a plurality of leaf-spacer pairs, each leaf-spacer pair having a leaf section which, in the leaf seal, maintains wiping contact with one of the components, and a root section which, in the leaf seal, is fixed relative to the other component and from which the leaf section extends, each leaf-spacer pair further having a spacer which overlays the root section, the leaf-spacer pairs being combined into the stack such that the leaf sections are arranged face-to-face and the spacers interpose between the root sections to space the leaf sections a controlled distance apart; wherein the stack is formed from a zigzag folded sheet of substantially uniform thickness in which the spacers and the root sections are connected in an alternating line across the sheet along fold lines, and the leaf sections extend from the root sections, and wherein the root section portions and/or the spacer portions are thinned relative to said thickness, but the leaf section portions retains said thickness. A sixth aspect of the present invention provides a leaf seal including one or more leaf-spacer pairs of the fourth aspect or one or more stacks of leaves of the fifth aspect.

The present invention is at least partly based on a realisation that thinned leaf sections can have problems of poor surface finish and premature leaf section failure. Advantageously, however, controlled distances between leaf sections can be achieved by thinning root section portions and/or the spacer portions instead, and allowing leaf sections to retain the original sheet thickness.

Optional features of the invention will now be set out. These are applicable singly or in any combination with any aspect of the invention.

In step (b) options are: to thin only the root section portion, to thin only the spacer portion, or to thin both the root section portion and the spacer portion. Thinning may be performed on one side only or on both sides of the respective portion.

In step (a) the sheet is preferably a rolled sheet and in step (b) the leaf section portion retains the as-rolled finish. For example, the sheet can be a cold-rolled sheet. Advantageously, a cold-rolled finish has been found to improve leaf section performance and reliability.

Step (b) typically includes thinning the or each fold line.

In step (b) the thinning may be performed by photochemical machining. Alternatively, in step (b) the thinning may be performed by micromachining.

The process typically also includes removing excess material from the or each sheet region in order to define a plenum hole in the root section, and/or to define one or more edges of the root section portion, spacer portion, and leaf section portion. The material removal may be performed by a similar process as the thinning procedure of step (b).

In step (a) the sheet may be formed from an Ni-based or a Co-based alloy, such as a superalloy. Alternatively, in step (a) the sheet may be formed from an Fe-based alloy, such as a stainless steel.

Embodiments and further optional feature of the invention will now be described by way of example with reference to the accompanying drawings in which:

FIG. 3 shows schematically a strip appropriately photochemically machined in order to create respective leaf seal sections;

FIG. 4 illustrates progressive stages (a) and (b) in the folding of the leaf seal sections of FIG. 3;

FIG. 7 shows schematically a seal element and spacers for forming leaf-spacer folded pairs with (a) a double side arm arrangement, and (b) a single side arm arrangement;

FIG. 8 illustrates an exaggerated fold between two leaf sections;

FIG. 11 is a schematic side view of the leaf stack formed after folding the strip of FIG. 8;

FIG. 12 shows schematically a strip according to a second embodiment of the present invention appropriately photochemically machined in order to create leaf sections, root sections and spacers;

FIG. 15 shows schematically a strip according to a third embodiment of the present invention appropriately photochemically machined in order to create leaf sections, root sections and spacers;

FIG. 16 illustrates progressive stages (a) and (b) in the folding of the strip of FIG. 15;

FIG. 21 shows schematically variants (a) and (b) of a sheet region according to a sixth embodiment of the present invention appropriately photochemically machined in order to create in a leaf-spacer pair a leaf section, a root section and a spacer;

FIG. 22 is a schematic side view of a leaf stack with an adjusted lay angle; and FIGS. 23(*a*) to (*d*) each show a leaf section and a root section with different tab or indentation arrangements at the sides of the root section.

Figure 9:
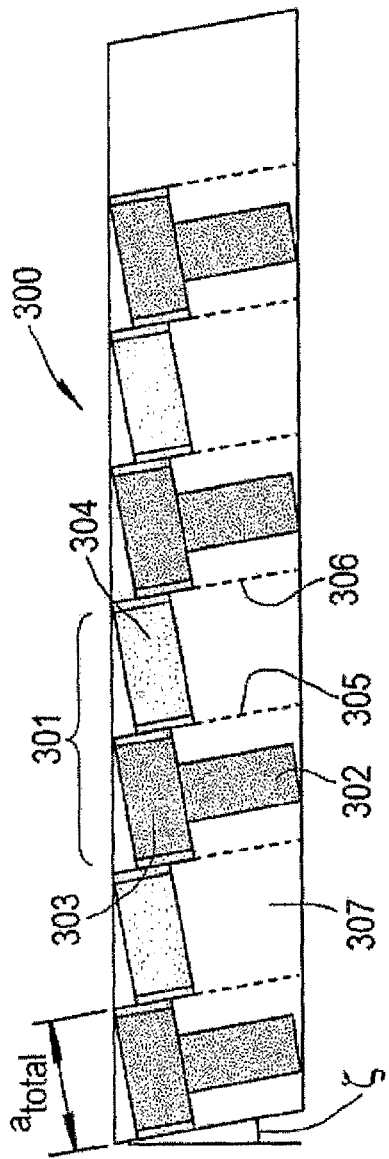
FIG. 9 shows schematically a strip according to a first embodiment of the present invention appropriately photochemically machined in order to create leaf sections, root sections and spacers.

FIG. 9 shows schematically a strip 300 according to a first embodiment of the present invention appropriately photochemically machined in order to create leaf sections, root sections and spacers. Prior to machining, the strip is in a cold-rolled condition and has a substantially uniform thickness. The strip contains a plurality of sheet regions 301, each sheet region having a leaf section portion 302, a root section portion 303 from which the leaf section portion extends, and a spacer portion 304 which is connected to the root section portion along a first fold line 305. The spacer portion of each sheet region is the same width as the root section portion and is also connected to the root section portion of a neighbouring sheet region along a second fold line 306 to provide an alternating line of connected root section portions and spacer portions. Each sheet region also contains waste material 307.

Electrochemical machining in used to thin the spacer portions 304, the fold lines 305, 306, and to remove the waste material 307 and optionally form plenum holes (not shown) in the root section and spacer portions. The leaf section portions 302 and the root section portions 303 are not machined and retain the as-rolled thickness and surface finish of the sheet 300.

The lay angle, $\theta$, in the eventual leaf assembly is achieved by provision of a tilt angle, $\zeta$, to which the leaf section portions 302 are tilted in the strip 300 and as depicted in FIG. 9. The angle of tilt, $\zeta$, is calculated using the formula below:

$$\tan\zeta = \frac{(t_1 + t_2)\tan\theta}{2 \cdot a_{total}}$$

where $t_1$=the thickness of the root section portions 303, $t_2$=the thickness of the spacer portions 304, and $a_{total}$=the spacing between the fold lines 305, 306.

Figure 10:
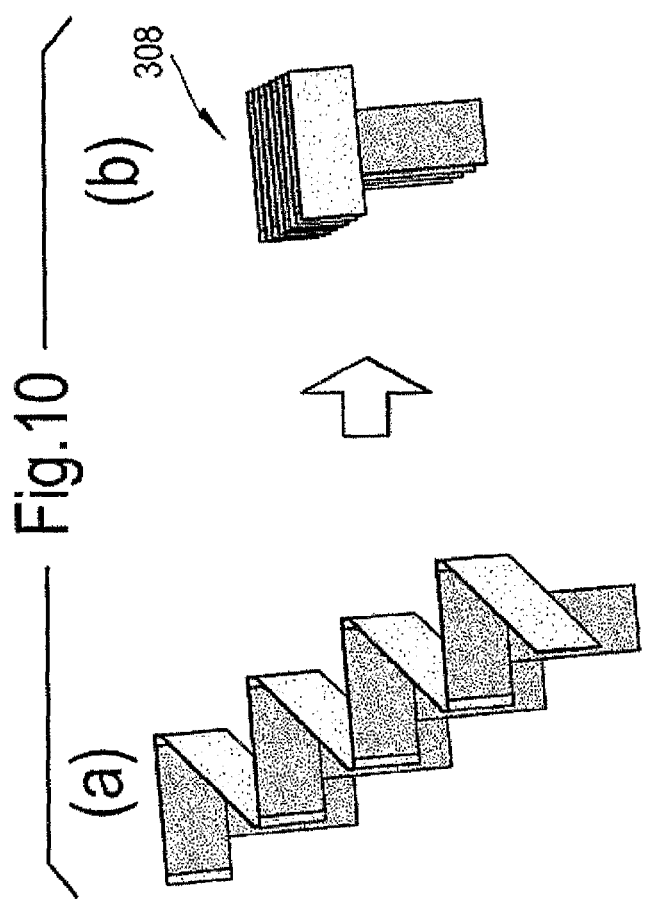
FIG. 10 illustrates progressive stages (a) and (b) in the folding of the strip of FIG. 9.

As shown in FIG. 10, a zigzag fold is then performed about fold lines 305, 306 in order to create a compressed leaf stack 308 which has alternating root sections and spacers juxtaposed to each other. FIG. 11 is a schematic side view of the stack and shows the lay angle, $\theta$, achieved after folding.

Figure 1:
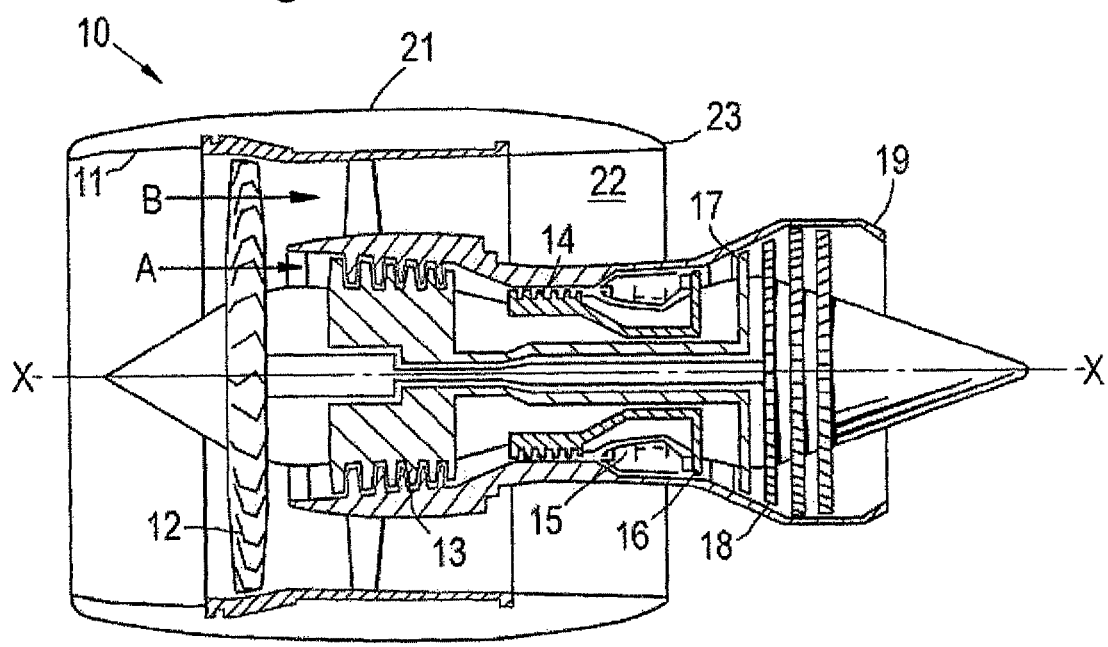
FIG. 1 shows schematically a longitudinal section through a turbofan engine.
Figure 2:
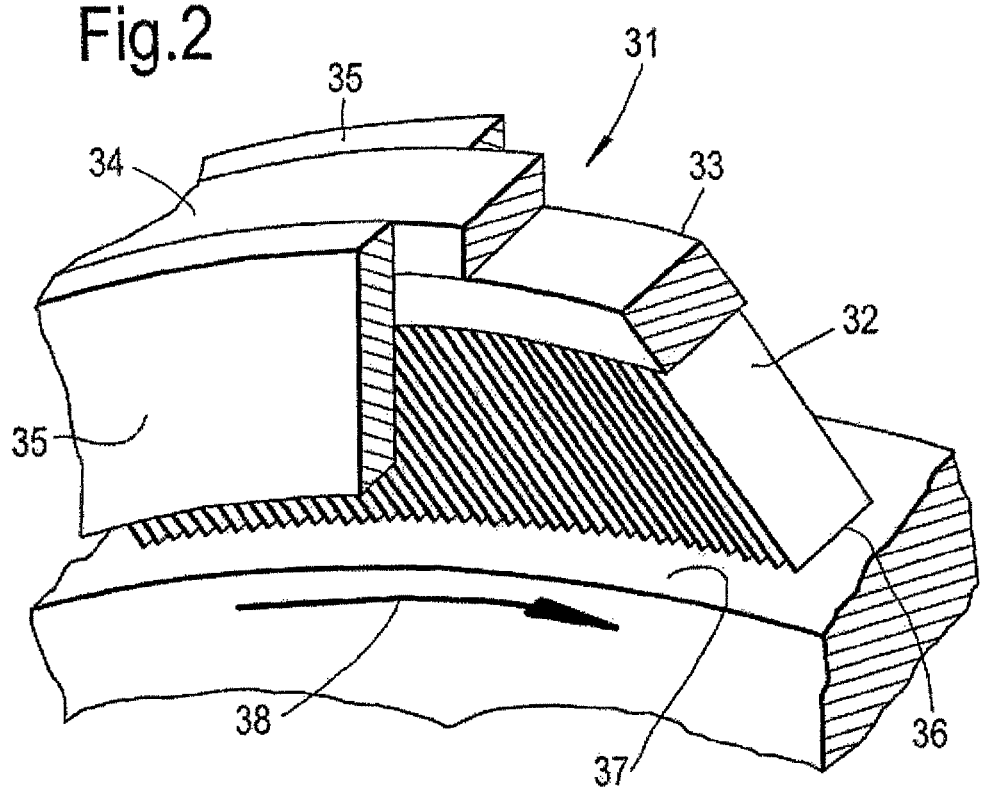
FIG. 2 shows schematically a cut-away perspective view of a portion of a leaf is seal assembly.
Figure 5:
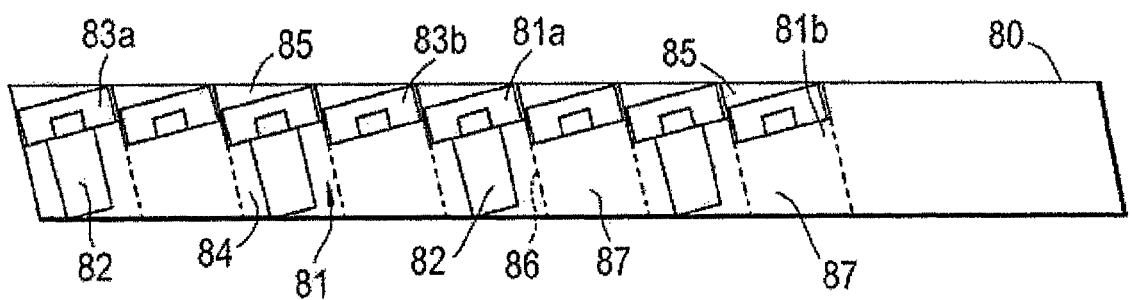
FIG. 5 shows schematically another strip appropriately photochemically machined in order to create respective leaf seal sections.
Figure 6:
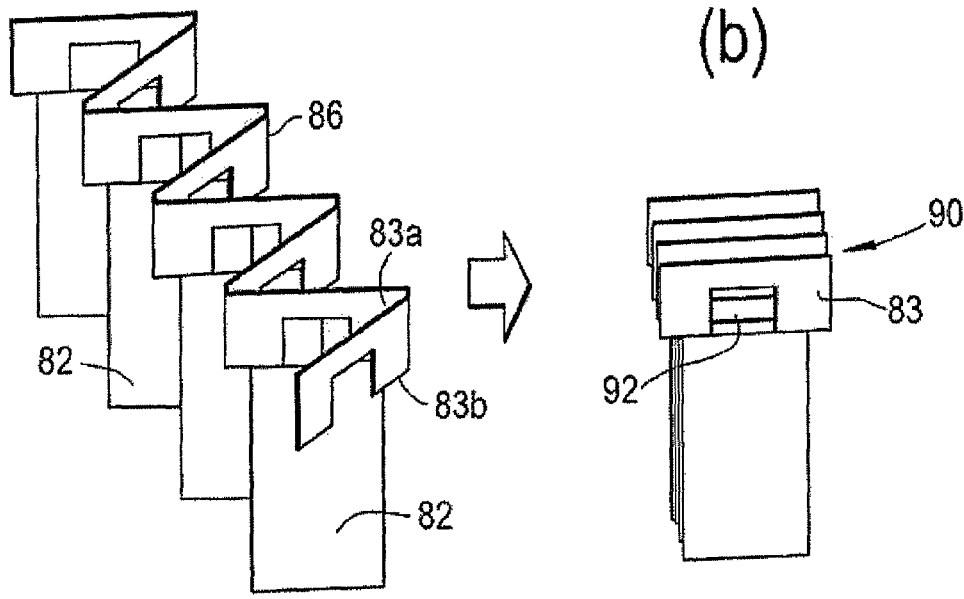
FIG. 6 illustrates progressive stages (a) and (b) in the folding of the leaf seal sections of FIG. 5.

The strip 300 of the first embodiment thus corresponds to the strip 80 shown in FIG. 5 in terms of arrangement of leaf section, root section and spacer portions. Significantly, however, in order to control the distance between leaf sections in the stack 308, the spacer portions are thinned, allowing the leaf sections to retain their as-rolled surface finish. Indeed, changing the spacer thickness simultaneously adjusts the lay angle. As photochemical machining can be associated with premature leaf section failure (e.g. due to surface roughness and hydrogen embrittlement), avoiding machining the leaf sections helps to improve the reliability and longevity of the leaf seal.

Figure 13:
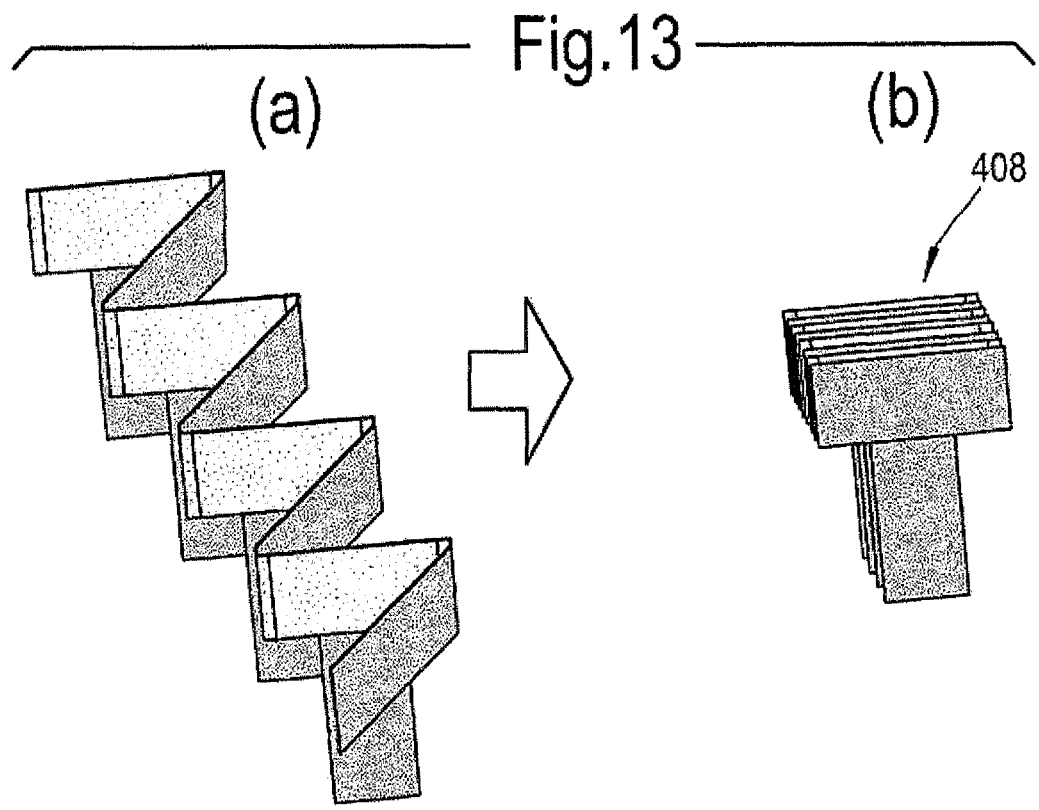
FIG. 13 illustrates progressive stages (a) and (b) in the folding of the strip of FIG. 12.
Figure 14:
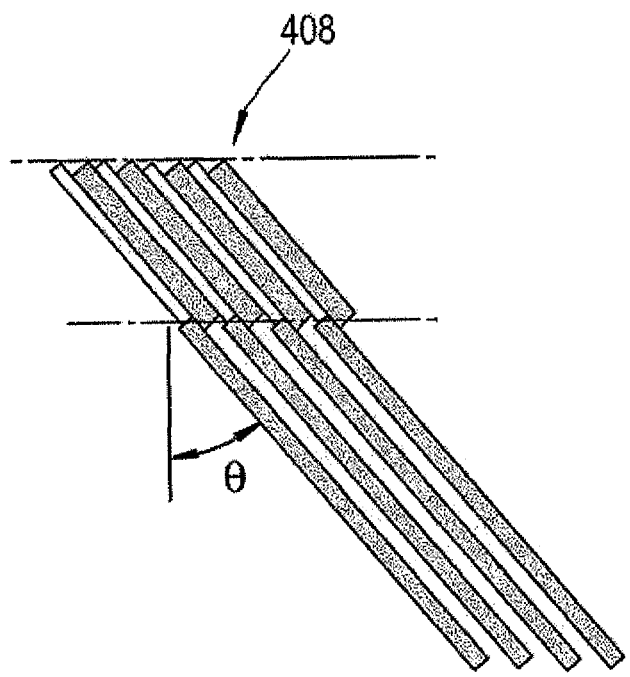
FIG. 14 is a schematic side view of the leaf stack formed after folding the strip of FIG. 12.

FIGS. 12 to 14 respectively correspond to FIGS. 9 to 11 for a second embodiment of the present invention. In the second embodiment, prior to machining, the strip 400 is again in a cold-rolled condition and has a substantially uniform thickness. The strip contains a plurality of sheet regions 401, each sheet region having a leaf section portion 402, a root section portion 403 from which the leaf section portion extends, and a spacer portion 404 which is connected to the root section portion along a first fold line 405. The spacer portion of each sheet region is the same width as the root section portion and is also connected to the root section portion of a neighbouring sheet region along a second fold line 406 to provide an alternating line of connected root section portions and spacer portions. Each sheet region also contains waste material 407.

In the second embodiment, however, instead of thinning the spacer portions 404, the root section portions 403 are thinned. This also has the effect of controlling the distance between leaf sections in the stack 408 and simultaneously controlling the lay angle. The thinning is performed, however, on the opposite side of the strip 400.

Figure 17:
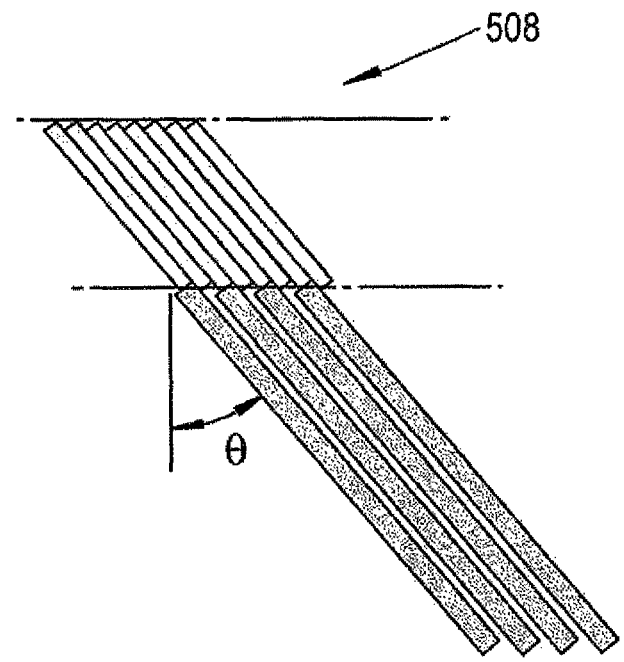
FIG. 17 is a schematic side view of the leaf stack formed after folding the strip of FIG. 15.

FIGS. 15 to 17 respectively correspond to FIGS. 9 to 11 and FIGS. 12 to 14 for a third embodiment of the present invention. In the third embodiment, prior to machining, the strip 500 is again in a cold-rolled condition and has a substantially uniform thickness. The strip contains a plurality of sheet regions 501, each sheet region having a leaf section portion 502, a root section portion 503 from which the leaf section portion extends, and a spacer portion 504 which is connected to the root section portion along a first fold line 505. The spacer portion of each sheet region is the same width as the root section portion and is also connected to the root section portion of a neighbouring sheet region along a second fold line 506 to provide an alternating line of connected root section portions and spacer portions. Each sheet region also contains waste material 507.

In the third embodiment, both the root section portions 503 and the spacer portions 504 are thinned, although on opposite sides of the strip 500. This two stage thinning process also helps to ensure that the fold lines 505, 506 are adequately thinned.

Figure 18:
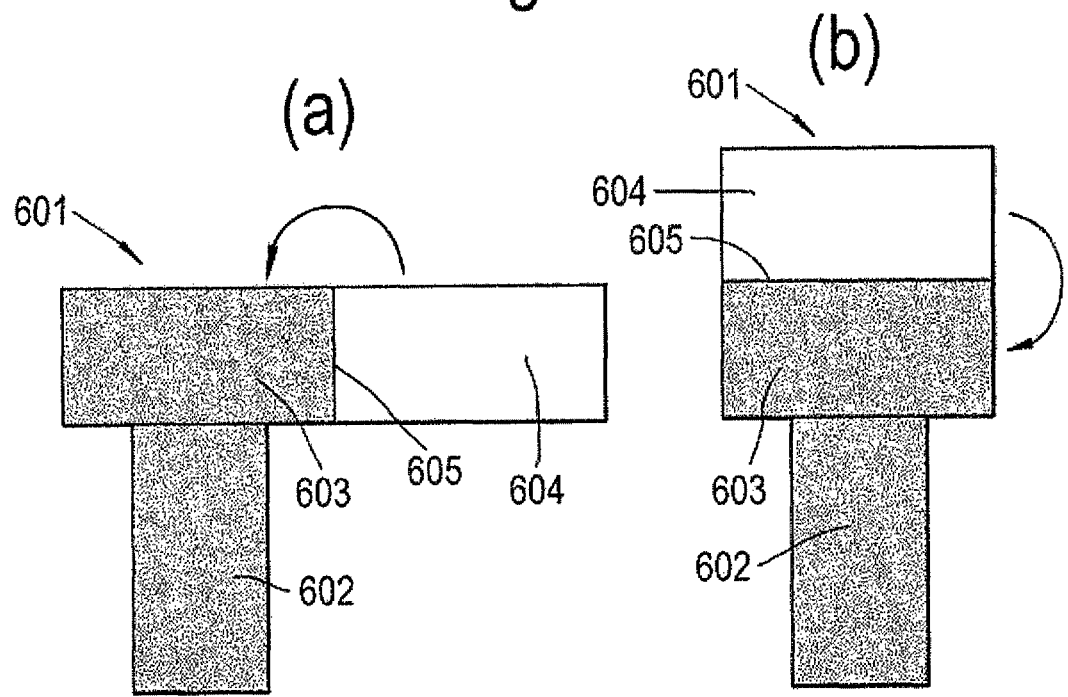
FIG. 18 shows schematically variants (a) and (b) of a sheet region according to a fourth embodiment of the present invention appropriately photochemically machined in order to create in a leaf-spacer pair a leaf section, a root section and a spacer.

FIG. 18(a) shows schematically an appropriately photo-chemically machined sheet region 601 according to a fourth embodiment of the present invention. In the fourth embodiment, prior to machining, the sheet region 601 is in a cold-rolled condition and has a substantially uniform thickness. The sheet region has a leaf section portion 602, a root section portion 603 from which the leaf section portion extends, and a spacer portion 604 which is connected to the root section portion along a side fold line 605. The spacer portion is the same width as the root section portion. In the fourth embodiment the spacer portion is thinned. FIG. 18(b) shows a variant of the sheet region of 601, in which the spacer portion 604 is connected to the root section portion along a top fold line 605.

Figure 19:
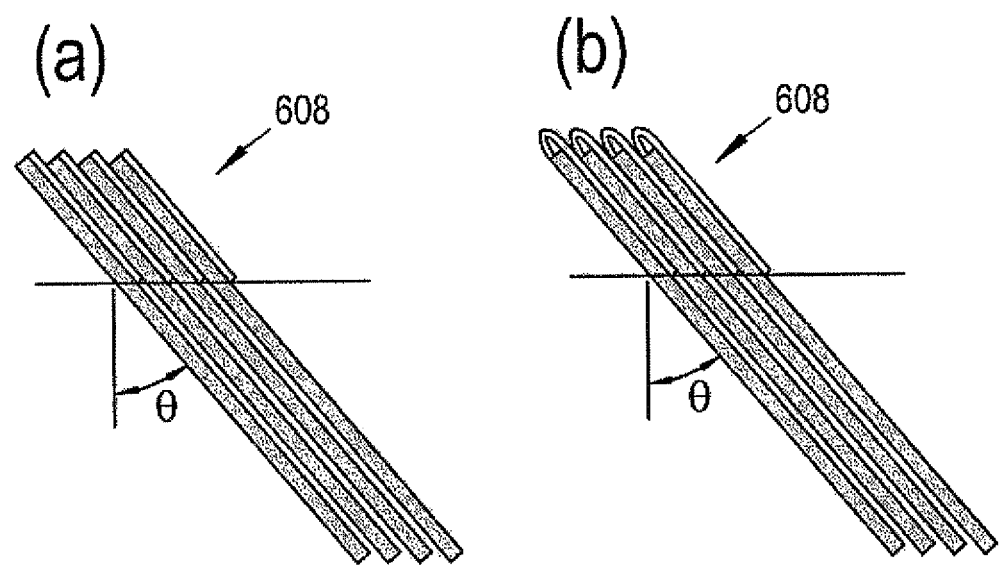
FIG. 19 is a schematic side view of leaf stacks (a) and (b) formed after folding the respective sheet regions of FIGS. 18(*a*) and (*b*) to form leaf-spacer pairs, and stacking with further similar leaf-spacer pairs.

In both variants, the spacer portion 604 is folded along the fold line 605 onto the root section portion 603 (as indicated by the arrows in FIGS. 18(a) and (b)) to form a leaf-spacer pair. Repeating this process for other sheet regions produces a plurality of leaf-spacer pairs. As shown in FIGS. 19(a) and (b), these can then be combined into a stack 608 in which leaf sections are arranged face-to-face and spacers interpose between root sections to space the leaf sections a controlled distance apart. This has the effect of controlling the distance between leaf sections in the stack, but allows for adjustment of the lay angle during assembly.

Figure 20:
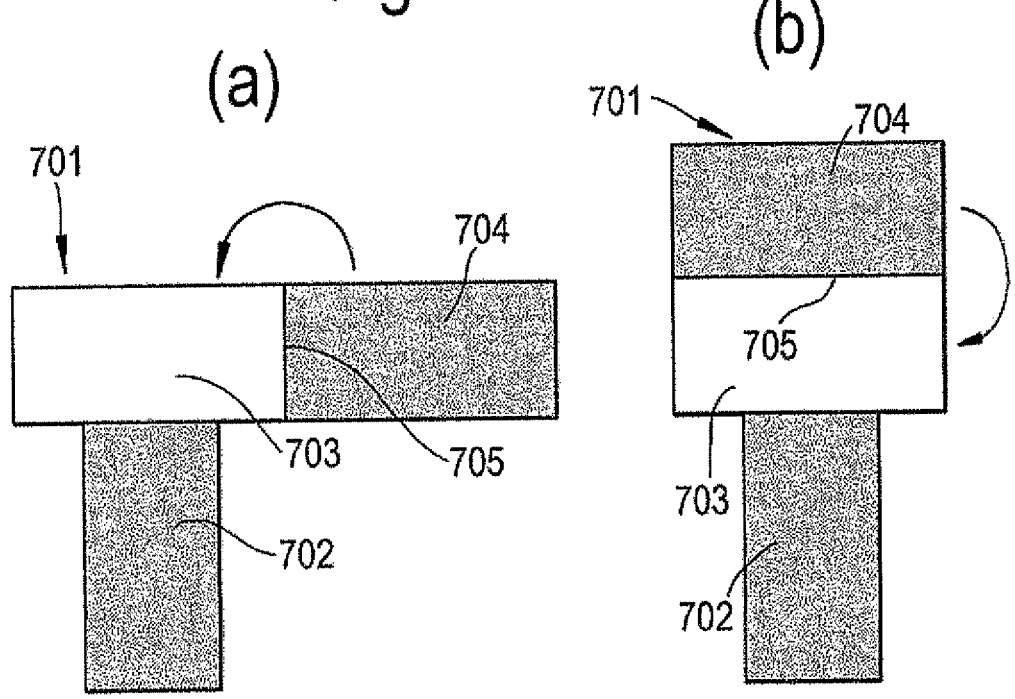
FIG. 20 shows schematically variants (a) and (b) of a sheet region according to a fifth embodiment of the present invention appropriately photochemically machined in order to create in a leaf-spacer pair a leaf section, a root section and a spacer.

FIGS. 20(a) and (b) respectively correspond to FIGS. 17(a) and (v) for a fifth embodiment of the present invention. In the fifth embodiment, prior to machining, the sheet region 701 is in a cold-rolled condition and has a substantially uniform thickness. The sheet region has a leaf section portion 702, a root section portion 703 from which the leaf section portion extends, and a spacer portion 704 which is connected to the root section portion along a fold line 705. In the fifth embodiment, however, the root section portion is thinned.

FIGS. 21(a) and (b) respectively correspond to FIGS. 17(a) and (v) for a sixth embodiment of the present invention. In the sixth embodiment, prior to machining, the sheet region 801 is in a cold-rolled condition and has a substantially uniform thickness. The sheet region has a leaf section portion 802, a root section portion 803 from which the leaf section portion extends, and a spacer portion 804 which is connected to the root section portion along a fold line 805. In the sixth embodiment both the root section portion and the spacer portion are thinned. As with the third embodiment, the two stage thinning process helps to ensure that the fold line 805 is adequately thinned.

In any of the above embodiments, the thinning of the root section portion and/or the spacer portion can be combined with bending the sheet region along the join line between the leaf section portion and the root section portion. As shown in FIG. 22, which is a schematic side view of the resulting leaf stack 908, this can produce an adjustment, Δθ, in the lay angle.

FIG. 23(a) shows a leaf section and a root section with a single tab 1001 projecting from each side of the root section for use in fitting the side plates of the final seal. This arrangement of projection tabs is also illustrated in respect of the embodiments discussed above. Other arrangements are, however, possible. In FIG. 23(b) the root section has two tabs 1002 projecting from each side. In FIG. 23(c) the root section has two tabs 1003 projecting form only one side. In FIG. 23(d) the root section has two indentations 1004 on only one side.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A process for forming a leaf-spacer pair for use in a leaf seal which effects a seal between two components, the leaf-spacer pair having a leaf section which maintains wiping contact with one of the components and a root section which is fixed relative to the other component and from which the leaf section extends, the leaf-spacer pair further having a spacer which overlays the root section, wherein the process includes the steps of:
   (a) providing a region of sheet of substantially uniform thickness, the sheet region having a leaf section portion, a root section portion from which the leaf section portion extends, and a spacer portion which is connected to the root section portion along a fold line;
   (b) thinning the root section portion and/or the spacer portion, the leaf section portion retaining said thickness of the region of sheet provided in step (a); and
   (c) folding the spacer portion onto the root section portion along the fold line to form the leaf-spacer pair in which the spacer overlays the root section and the leaf section extends therefrom.

2. A process for forming a stack of leaves for use in a leaf seal, the process including:
   repeatedly performing the process of claim 1 to form a plurality of leaf-spacer pairs; and
   combining the leaf-spacer pairs into a stack in which the leaf sections are arranged face-to-face and the spacers interpose between the root sections to space the leaf sections a controlled distance apart.

3. The process for forming a leaf-spacer pair according to claim 1, wherein the spacer portion is of the same width as the root section portion, and wherein step (b) comprises thinning the entire spacer portion and/or the entire root section portion.

4. The process according to claim 1, wherein in step (a) the sheet is a rolled sheet and in step (b) the leaf section portion retains an as-rolled finish.

5. The process according to claim 1, wherein step (b) includes thinning the or each fold line.

6. The process according to claim 1, wherein in step (b) the thinning is by photochemical machining.

7. The process according to claim 1, wherein in step (b) the thinning is by micromachining.

8. The process according to claim 1, wherein in step (a) the sheet is formed from an Ni-based or a Co-based alloy or an Fe-based alloy.

9. A leaf-spacer pair for use in a leaf seal, the leaf-spacer pair being formed by the process of claim 1.

10. A stack of leaves for use in a leaf seal, the stack being formed by the process of claim 2.

11. A leaf seal including one or more leaf-spacer pairs of claim 9.

12. A process for forming a stack of leaves for use in a leaf seal which effects a seal between two components, each leaf of the stack having a leaf section which maintains wiping contact with one of the components and a root section which is fixed relative to the other component and from which the leaf section extends, the stack including a plurality of spacers which interpose between the root sections, wherein the process includes the steps of:
   (a) providing a sheet of substantially uniform thickness and containing a plurality of sheet regions, each sheet region having a leaf section portion, a root section portion from which the leaf section portion extends, and a spacer portion which is connected to the root section portion along a first fold line, wherein the spacer portion of each sheet region is also connected to the root section portion of a neighbouring sheet region along a second fold line to provide an alternating line of connected root section portions and spacer portions;
   (b) for each sheet region, thinning the respective root section portion and/or the respective spacer portion, the respective leaf section portion retaining said thickness of the region of sheet provided in step (a); and
   (c) zigzag folding the alternating line of spacer portions and the root section portions along the first and second fold lines such that for each sheet region the respective spacer portion is folded onto the respective root section portion to form a leaf-spacer pair, and the leaf-spacer pairs are combined into a stack in which the leaf sections are arranged face-to-face and the spacers interpose between the root sections to space the leaf sections a controlled distance apart.

13. The process according to claim 12, wherein in step (a) the sheet is a rolled sheet and in step (b) the leaf section portion retains the as-rolled finish.

14. The process according to claim 12, wherein step (b) includes thinning the/or each fold line.

15. The process according to claim 12, wherein in step (b) the thinning is by photochemical machining.

16. The process according to claim 12, wherein in step (b) the thinning is by micromachining.

17. The process according to claim 12, wherein in step (a) the sheet is formed from an Ni-based or a Co-based alloy or an Fe-based alloy.

18. A stack of leaves for use in a leaf seal, the stack being formed by the process of claim 12.

19. A leaf-spacer pair for use in a leaf seal, the leaf-spacer pair being formed by the process of claim 13.

* * * * *